US006947021B2

(12) United States Patent
Nah et al.

(10) Patent No.: US 6,947,021 B2
(45) Date of Patent: Sep. 20, 2005

(54) LIQUID CRYSTAL DISPLAY

(75) Inventors: Keun-Shik Nah, Incheon (KR); Dong-Ho Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 459 days.

(21) Appl. No.: 10/253,407

(22) Filed: Sep. 24, 2002

(65) Prior Publication Data

US 2003/0067433 A1 Apr. 10, 2003

(30) Foreign Application Priority Data

Sep. 27, 2001 (KR) ........................................ 2001-60076

(51) Int. Cl.[7] .................................................. G09G 3/36
(52) U.S. Cl. ........................................ 345/88; 345/87
(58) Field of Search ...................... 345/87–100; 349/33, 349/37; 359/56

(56) References Cited

U.S. PATENT DOCUMENTS 5,745,200 A * 4/1998 Kikuchi et al. ............... 349/99
5,920,301 A * 7/1999 Sakamoto et al. ............ 345/96
5,956,006 A * 9/1999 Sato ............................ 345/88
5,963,187 A * 10/1999 Tanaka et al. ................ 345/97

* cited by examiner

Primary Examiner—Vijay Shankar
(74) Attorney, Agent, or Firm—F. Chau & Associates, LLC

(57) ABSTRACT

A liquid crystal display having a plurality of gate lines and a plurality of data lines extending in row and column directions, respectively, are formed on a panel. A switching device connected to the gate line and the data line and a pixel electrode connected thereto are provided in each of pixel areas partitioned by the gate lines and data lines. A data driving circuit and a data driving circuit are also provided on the panel, and apply voltages to the gate lines. A signal wire connected to the data driving circuit and including a plurality of color signal lines is provided on the panel and connects the data driving circuit to a signal controller of a printed circuit board. A pair of the plurality of color signal lines with differential relationship transmit color signals to the data driving circuit. A distance between the pair of the plurality of color signal lines is smaller than a width of each of the pair of the plurality of color signal lines and a distance between a pair of plurality of color signal lines without differential relationship. This relationship of the distances between the signal lines and the width thereof reduces the EMI noise.

16 Claims, 3 Drawing Sheets

LIQUID CRYSTAL DISPLAY

BACKGROUND OF THE INVENTION

(a) Field of the Invention

The present invention relates to a liquid crystal display and, more specifically, to a liquid crystal display having signal lines for transmitting differential color signals.

(b) Description of the Related Art

A liquid crystal display (referred to as an LCD hereinafter) is one of the most widely used flat panel displays at present. The LCD generally includes two panels having a plurality of electrodes for generating electric field formed thereon, a liquid crystal layer interposed between the panels and polarizers for polarizing light attached to outer surfaces of the respective panels. The brightness of light from the LCD is controlled by applying voltages to the electrodes to rearrange liquid crystal molecules. A plurality of switching devices such as thin film transistors (referred to as TFTs hereinafter), connected to the electrodes, for switching the voltages applied to the electrodes are provided on one of the panels.

The LCDs include driving circuits and a controller for controlling the driving circuits to supply voltages for the electrodes through the switching devices. In general, the controller is provided external to the panels, and the driving circuits are placed either within or external to the panel. In the latter case, the driving circuits are mounted on a flexible printed circuit (FPC) film in a form of integrated circuit (IC) chips. However, in the former case, the driving circuits are either disposed on the panel in the form of IC chips, which is called COG (chip on glass) type, or incorporated with the panel by manufacturing them along with the TFTs. The latter case is generally used for the LCDs having the TFTs with polysilicon channel layers.

In the LCD, in particular, in the COG type LCD, when the signals travel from and to the controller, the driving circuits, etc. through signal lines, electromagnetic field is generated around the signal lines carrying the signals. The electromagnetic field induces interfering signals (noise) in the signal lines adjacent to the signal carrying line, thereby causing electromagnetic interference (EMI).

One of the suggested methods for reducing EMI noise is to use differential signals. Differential signals are a pair of signals having the same amplitudes but inverted phases. Instead of transmitting a signal alone, a counterpart signal having differential relationship with the original signal is generated, and the two signals are simultaneously transmitted through neighboring signal lines. The electromagnetic fields generated from the two signal lines cancel each other and EMI is decreased. However, if the two signal lines are not properly spaced, the EMI cancellation effect is decreased. Furthermore, the electromagnetic fields from the signal lines carrying two signals which are not differential interfere with each other and signal distortion is increased. Thus, it is desirable to provide an LCD having signal lines with reduced signal noise.

SUMMARY OF THE INVENTION

A liquid crystal display is provided, which includes: a panel; a plurality of gate lines provided on the panel for transmitting scanning signals; a plurality of data lines provided on the panel for transmitting image signals; a plurality of switching devices connected to the plurality of gate lines and the plurality of data lines; a plurality of pixel electrodes connected to the switching devices; a gate driving circuit connected to the plurality of gate lines; a data driving circuit provided on the panel and connected to the plurality of data lines; and a signal wire connected to the data driving circuit and including a plurality of color signal lines, wherein a pair of the plurality of color signal lines with differential relationship transmit color signals to the data driving circuit, and a distance (D) between the pair of the plurality of color signal lines is smaller than a width (W) of each of the pair of the plurality of color signal lines.

Preferably, the liquid crystal display further includes a printed circuit board having a signal controller for controlling the gate driving circuit and the data driving circuit and generating color signals. The liquid crystal display further includes at least one flexible printed circuit film for physically and electrically connecting the printed circuit board to the panel, wherein the data driving circuit and the signal controller are electrically connected via the signal wire, and the printed circuit board and the flexible printed circuit film are disposed adjacent to one edge of the panel.

According to an embodiment of the present invention, the gate driving circuit is provided on the panel. Each of the plurality of switching devices is a thin film transistor. The thin film transistor has a channel region, the channel region is formed of amorphous silicon or polysilicon. At least one of the gate driving circuit and the data driving circuit is manufactured in a form of a chip to be directly mounted on the panel. At least one of the gate driving circuit and the data driving circuit includes a transistor having a channel layer of amorphous silicon. The transistor is incorporated with the panel.

According to an embodiment of the present invention, the distance (D) is smaller than a distance (P) between a pair of the plurality of color signal lines without differential relationship. The distance (D), the width (W), and the distance (P) satisfy following inequality: $(2W+D)>P$.

The distance (D), the width (W), and the distance (P) satisfy following inequality: $D<(1-K)P$; $(2W+D)>P$; and $W>D$, where K is a manufacturing error factor. The manufacturing error factor is about 0.2.

The distance (D), the width (W), and the distance (P) satisfy following inequality: $(1+K)D/(1-K)<P<(2W+D)$; and $W>D$, where K is a manufacturing error factor. The manufacturing error factor is about 0.2.

A method of driving a liquid crystal display is also provided, which includes the steps of: transmitting scanning signals to a plurality of switching devices through a plurality of gate lines provided on a panel; transmitting image signals to a plurality of pixel electrodes through a plurality of data lines provided on the panel; providing a gate driving circuit for driving the plurality of gate lines; providing a data driving circuit on the panel for driving the plurality of data lines; and connecting a signal wire to the data driving circuit, the signal wire including a plurality of color signal lines, for driving a plurality of color signal lines differentially, wherein a distance (D) between a pair of the plurality of color signal lines with differential relationship is smaller than a width (W) of each of the plurality of color signal lines and smaller than a distance (P) between a pair of the plurality of color signal lines without differential relationship.

BRIEF DESCRIPTION OF THE DRAWINGS

The features and advantages of the present invention will become more apparent from the detailed description of preferred embodiments with reference to the accompanying drawings, like reference numerals are used for description of like or equivalent parts or portions for simplicity of illustration and explanation.

DETAILED DESCRIPTION OF PREFERRED EMBODIMENTS

Figure 1A:
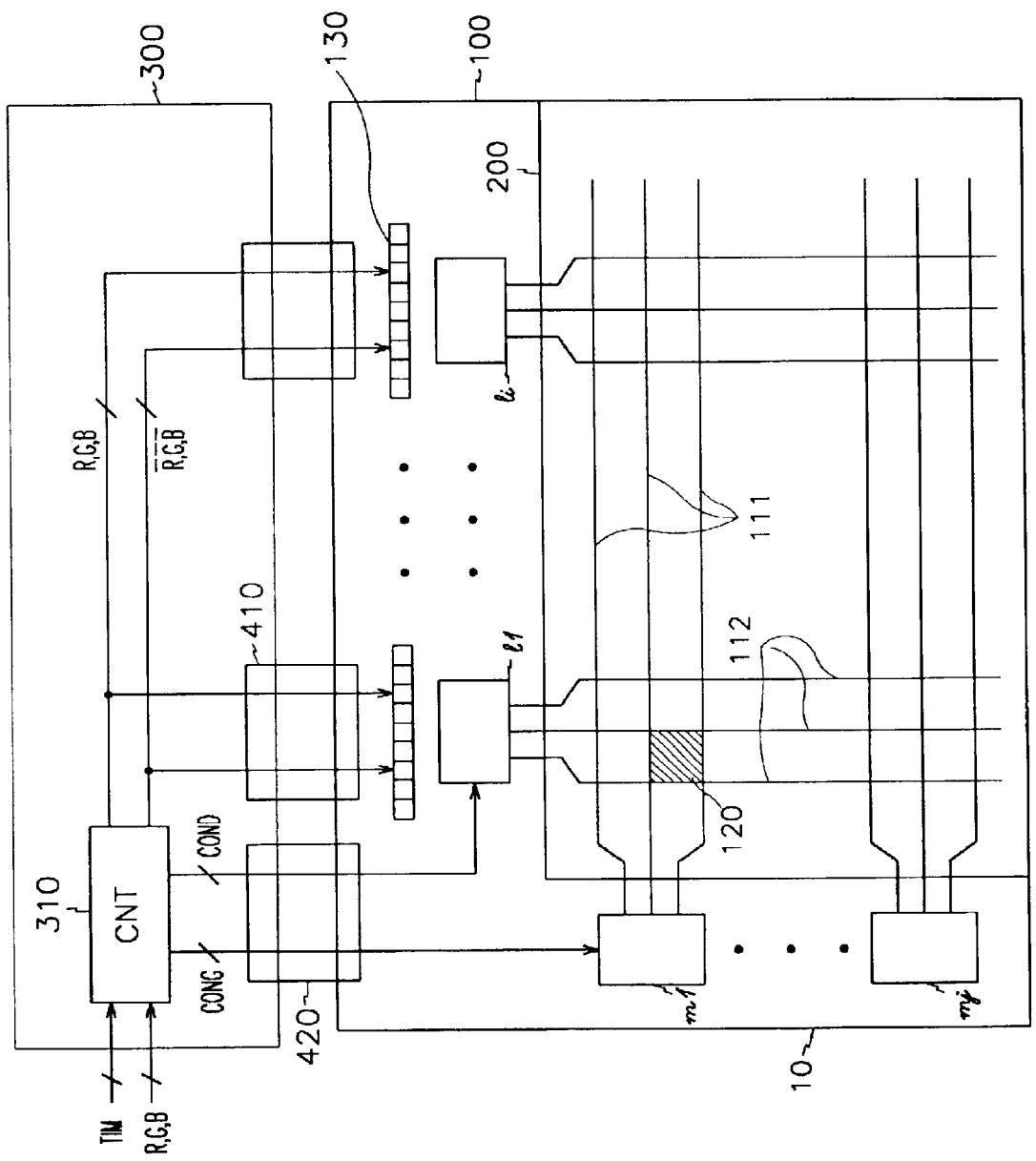
FIG. 1A is a schematic diagram showing a configuration of an LCD according to an embodiment of the present invention.

The features and advantages of the present invention will become more apparent from the detailed description of preferred embodiments with reference to the accompanying drawings, like reference numerals are used for description of like or equivalent parts or portions for simplicity of illustration and explanation.

Figure 1B:
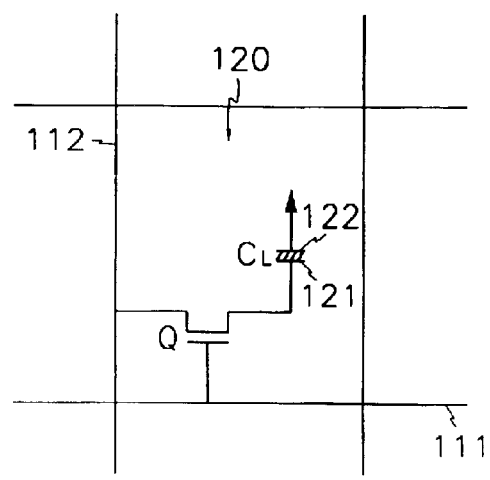
FIG. 1B shows a circuit of a pixel area in FIG. 1A.
Figure 2:
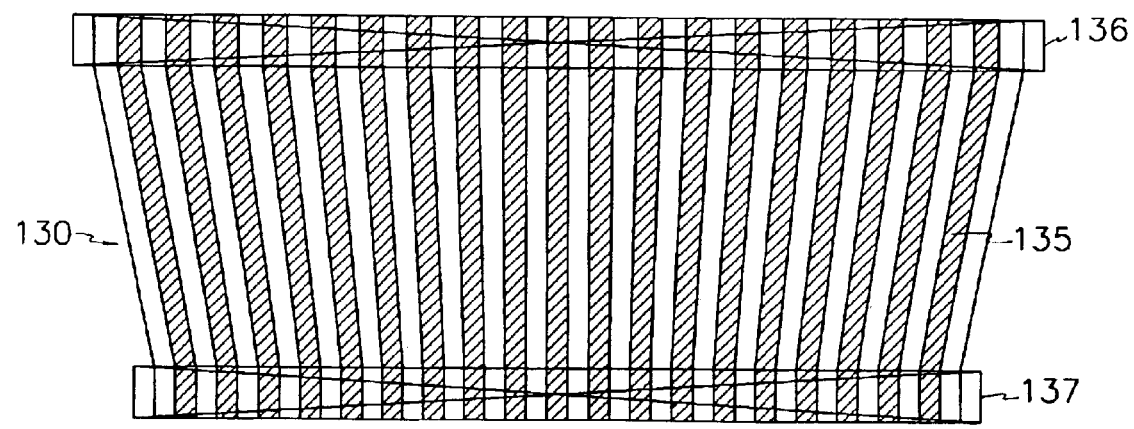
FIG. 2 shows a layout of a differential signal wire unit of FIG. 1A.

FIG. 1A is a schematic diagram showing a configuration of an LCD according to an embodiment of the present invention, FIG. 1B shows a circuit of a pixel area in FIG. 1A, and FIG. 2 shows an layout of a differential signal wire unit of FIG. 1A.

An LCD according to an embodiment of the present invention includes an LCD panel assembly 10 having first and second panels 100 and 200 facing each other, a plurality of gate driving circuits $m_1-m_j$ placed on an edge portion of the first panel 100, a plurality of data driving circuits $l_1-l_i$ placed on another edge portion of the first panel 100, a PCB 300 for controlling the plurality of gate driving circuits $m_1-m_j$ and the plurality of data driving circuits $l_1-l_i$, and a plurality of FPC films 410 and 420 for connecting the first panel 100 to the PCB 300. Preferably, the first panel 100 is larger than the second panel 200.

The first panel 100 is divided into a display area and a peripheral area outside of the display area. The display area includes a plurality of the signal lines, such as a plurality of gate lines 111 extending in a row direction and a plurality of data lines 112 extending in a column direction. Each of pixel areas 120 partitioned by the plurality of gate lines 111 and the plurality of data lines 112 has a switching device Q such as a TFT and a pixel electrode 121 connected thereto. A channel layer of the TFT is formed of amorphous silicon or polysilicon. The pixel electrode 121 and a common electrode 122 form a liquid crystal capacitor $C_L$, and generate an electric field for controlling liquid crystal molecules disposed between the pixel electrode 121 and the common electrode 122. The common electrode 122 is formed on either the second panel 200 or the first panel 100. For the former case, the common electrodes 122 in the pixel areas form a single planar electrode, while they are in forms of stripes for the latter case.

The plurality of gate driving circuits $m_1-m_j$ and the plurality of data driving circuits $l_1-l_i$ are disposed on the peripheral area of the first panel 100 having the switching devices Q, and are connected to one ends of the gate lines 111 and the data lines 112 extending from the display area to the peripheral area, respectively. According to an embodiment of the present invention, the plurality of gate driving circuits $m_1-m_j$ and the plurality of data driving circuits $l_1-l_i$ can be separately manufactured in the form of chips to be directly mounted on the first panel 100 or can be manufactured along with the switching devices Q in the first panel 100 to be incorporated with the first panel 100. Alternatively, one of the plurality of driving circuits $m_1-m_j$ and the plurality of the gate driving circuits $l_1-l_i$ can be manufactured in the COG type, and the other can be incorporated with manufacture of the panel 100 and components on the panel 100. In case of the incorporation type, the channel layers of the switching devices Q are made of amorphous silicon or polysilicon; preferably, amorphous silicon is used because of its ease in the manufacturing process.

A plurality of differential signal wire units 130 are provided between an edge of the first panel 100 and the plurality of data driving circuits $l_1-l_i$. As shown in FIG. 2, each of the plurality of differential signal wire units 130 has a plurality of signal lines 135 and is connected to a corresponding one of the plurality of data driving circuits $l_1-l_i$ through a first contact portion 137. Here, differential signals are defined as a pair of signals having the same amplitudes but inverted phases. Thus, the differential signal lines have a pair of signals having the same amplitudes but inverted phases. For the plurality of driving circuits $m_1-m_j$ or the plurality of data driving circuits $l_1-l_i$ in the incorporation type, the first contact portion 137 is not provided. A signal wire for transmitting external signals to the plurality of gate driving circuits $m_1-m_j$ is provided on one corner of the first panel 100.

The PCB 300 is positioned adjacent to the plurality of data driving circuits $l_1-l_i$ or the plurality of differential signal wire units 130 of the panel 100. The PCB 300 has a plurality of electrical circuits, such as a signal controller 310, for generating signals and controlling the plurality of driving circuits $m_1-m_j$ and the plurality of gate driving circuits $l_1-l_i$.

The plurality of FPC films 410 and 420 are physically attached to respective edges of the TFT panel 100 and the PCB 300 adjacent to the plurality of data driving circuits $l_1-l_i$ or the plurality of differential signal wire units 130. A plurality of signal lines (not shown) are provided to the plurality of FPC films 410 and 420, and connected to the plurality of signal lines 135 through a second contact portion 136 to transmit signals from the PCB 300 to the panel assembly 10.

Although the plurality of gate driving circuits $m_1-m_j$ are disposed on the first panel 100 in this embodiment of the present invention, they can be mounted as chips on additional FPC films which can be attached to an edge portion of the display panel 100 adjacent to the gate driving circuits $m_1-m_j$ of this embodiment. Furthermore, as shown in FIG. 1A, all signals entering the plurality of gate driving circuits $m_1-m_j$ and the plurality of data driving circuits $l_1-l_i$ are preferably supplied for the panel assembly 10 via the single FPC film 410 or the separate FPC films 410 and 420. An additional PCB can be provided near the plurality of gate driving circuits $m_1-m_j$.

The plurality of differential signal wire units 130 are electrically coupled to the signal controller 310 through the plurality of FPC films 410 for receiving a plurality of pairs of differential color signals R and $\overline{R}$; G and $\overline{G}$; B and $\overline{B}$ generated by the signal controller 310. It is apparent that other control signals COND being supplied for the data driving circuits $l_1-l_i$ can be transmitted by way of the plurality of differential signal wire units 130.

The width of each of the plurality of differential signal lines 135 and the distance therebetween are properly adjusted for maximizing cancellation of the EMI generated by signals flowing in the plurality of signal lines 135. Now, it is described the relationship between the width and the distance in detail with reference to FIG. 3.

Figure 3:
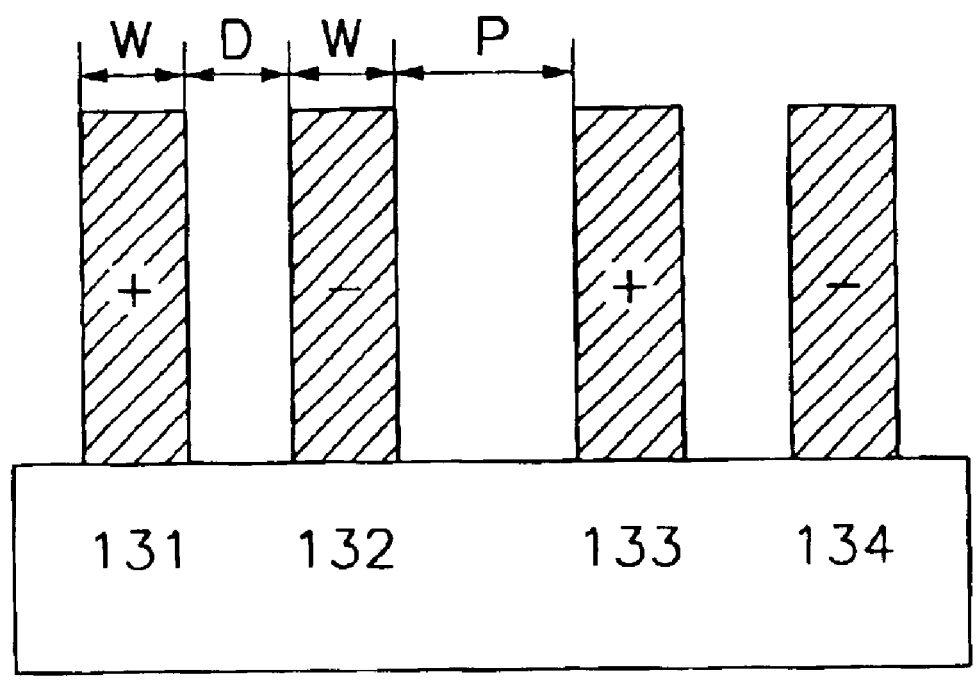
FIG. 3 shows an enlarged view of differential signal lines of an LCD according to an embodiment of the present invention.

FIG. 3 shows an enlarged view of the plurality of differential signal lines 135 according to an embodiment of the present invention. To induce a magnetic field for canceling EMI, a pair of signal lines 131 and 132 or 133 and 134 transmit signals differentially, i.e., transmit differential signals with equal amplitudes and inverted phases. It is preferable that a distance between the two signal lines 131 and 132 or 133 and 134 with differential relationship is as small as possible. On the contrary, the signal lines 132 and 133 without the differential relationship should be properly spaced apart from each other to avoid EMI distortion.

According to an embodiment of the present invention, a distance D between the signal lines with the differential relationship is smaller than the width W of each of the signal lines, and the distance P between the signal lines without the differential relationship is larger than the distance D. In addition, it is preferable that the distance P is larger than the width W.

In the meantime, the manufacturing errors or tolerances in the manufacturing process of an LCD must be considered. When an error factor of the distance D is defined as $K_1$ (×100%) and an error factor of the distance P is defined as $K_2$ (×100%), the following relationship should be satisfied:

$$D \pm K_1 D < P \pm K_2 P,$$

which results in $$D + K_1 D < P - K_2 P.$$

As a result, the relationship between the distances D and P is given by the following inequality:

$$D < \frac{1 - K_2}{1 + K_1} P.$$

If only the distance P has an error, the relationship becomes $$D < (1 - K_2) P.$$

In general, because the manufacturing error is about 20 percents, i.e., $K_2$ is about 0.2, $$D < 0.8P.$$

In addition, if the error factors of the distances D and P are the same as K, the relationship becomes:

$$D < \frac{1 - K}{1 + K} P$$

or $$P > \frac{1 + K}{1 - K} D.$$

If K is 0.2, $$D < \frac{0.8}{1.2} P \approx 0.67P.$$

Since an area which occupied by the differential signal lines is limited, the distances D and P cannot be increased indefinitely and satisfy the following relationship:

$$2W + D > P.$$

Therefore, the interval P between the signal lines without differential relationship is restricted by the following inequality:

$$\frac{1 + K}{1 - K} D < P < 2W + D.$$

Next, an operation of the LCD according to an embodiment of the present invention is described in detail.

Referring back to FIG. 1A and FIG. 3, the signal controller 310 on the PCB 300 is provided with color signals R, G, and B and control signals TIM from an external graphic controller (not shown). The signal controller 310 generates the pairs of differential color signals R and $\overline{R}$; G and $\overline{G}$; B and $\overline{B}$ based on each color signal R, G, or B, and supplies them for the plurality of driving circuits $l_1$–$l_i$ through a pair of the differential signal lines 131 and 132, or 133 and 134 having the distance D.

The signal controller 310 also generates gate control signals CONG and the data control signals COND based on the control signals TIM, and supplies each of the gate control signals CONG and each of the data control signals COND for each of the plurality of gate driving circuits $m_1$–$m_j$ and each of the plurality of data driving circuits $l_1$–$l_i$, respectively.

Each of the plurality of gate driving circuits $m_1$–$m_j$ applies gate-on voltage to the gate line 111 (in FIG. 1B) in sequence based on the gate control signals CONG. The plurality of data driving circuits $l_1$–$l_i$ convert the respective differential color signals R and $\overline{R}$; G and $\overline{G}$; B and $\overline{B}$ into the original color signals R, G, and B, and select data voltages corresponding to the respective color signals R, G, and B to apply to the plurality of data lines 112. The data voltages are applied to the pixel electrodes 121 via the switching devices Q turned on by the gate-on voltages, thereby selectively orienting the arrangement of the liquid crystal molecules to display images on the LCD.

As described above, the present invention properly determines the distances between the signal lines for transmitting the differential color signals to the data driving circuits. Therefore, the EMI noise cancellation effect between the differential signal lines is maximized to decrease signal distortion caused by the interference.

While this invention has been described in connection with the preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of driving a liquid crystal display, comprising the steps of:

transmitting scanning signals to a plurality of switching devices through a plurality of gate lines provided on a panel;

transmitting image signals to a plurality of pixel electrodes through a plurality of data lines provided on the panel;

providing a gate driving circuit for driving the plurality of gate lines;

providing a data driving circuit on the panel for driving the plurality of data lines; and connecting a signal wire to the data driving circuit, the signal wire including a plurality of color signal lines, for driving a plurality of color signal lines differentially, wherein a distance (D) between a pair of the plurality of color signal lines with differential relationship is smaller than a width (W) of each of the plurality of color signal lines and smaller than a distance (P) between a pair of the plurality of color signal lines without differential relationship.

2. A liquid crystal display comprising:

a panel;

a plurality of gate lines provided on the panel and transmitting scanning signals;

a plurality of data lines provided on the panel and transmitting image signals;

a plurality of switching devices connected to the plurality of gate lines and the plurality of data lines;

a plurality of pixel electrodes connected to the switching devices;

a gate driving circuit connected to the plurality of gate lines;

a data driving circuit provided on the panel and connected to the plurality of data lines; and a signal wire connected to the data driving circuit and including a plurality of color signal lines, wherein a pair of the plurality of color signal lines with differential relationship transmit color signals to the data driving circuit, and a distance (D) between the pair of the plurality of color signal lines is smaller than a width (W) of each of the pair of the plurality of color signal lines.

3. The liquid crystal display of claim 2, further comprising a printed circuit board having a signal controller for controlling the gate driving circuit and the data driving circuit and generating differential color signals.

4. The liquid crystal display of claim 3, further comprising at least one flexible printed circuit film for physically and electrically connecting the printed circuit board to the panel, wherein the data driving circuit and the signal controller are electrically connected via the signal wire, and the printed circuit board and the flexible printed circuit film are disposed adjacent to one edge of the panel.

5. The liquid crystal display of claim 2, wherein the gate driving circuit is provided on the panel.

6. The liquid crystal display of claim 2, wherein each of the plurality of switching devices is a thin film transistor.

7. The liquid crystal display of claim 6, wherein the thin film transistor has a channel region, the channel region is formed of amorphous silicon or polysilicon.

8. The liquid crystal display of claim 1, wherein at least one of the gate driving circuit and the data driving circuit is manufactured in a form of a chip to be directly mounted on the panel.

9. The liquid crystal display of claim 1, wherein at least one of the gate driving circuit and the data driving circuit includes a transistor having a channel layer of amorphous silicon.

10. The liquid crystal display of claim 9, wherein the transistor is incorporated with the panel.

11. The liquid crystal display of claim 1, wherein the distance (D) is smaller than a distance (P) between a pair of the plurality of color signal lines without differential relationship.

12. The liquid crystal display of claim 11, wherein the distance (D), the width (W), and the distance (P) satisfy following inequality:

$$2W+D>P.$$

13. The liquid crystal display of claim 11, wherein the distance (D), the width (W), and the distance (P) satisfy following inequality:

$$D<(1-K)P.$$

where K is a manufacturing error factor.

14. The liquid crystal display of claim 13, wherein the manufacturing error factor is about 0.2.

15. The liquid crystal display of claim 11, wherein the distance (D), the width (W), and the distance (P) satisfy following inequality:

$$\frac{1+K}{1-K}D < P < 2W + D,$$

where K is a manufacturing error factor.

16. The liquid crystal display of claim 15, wherein the manufacturing error factor is about 0.2.

* * * * *